(12) United States Patent
Hanna et al.

(10) Patent No.: US 10,724,993 B2
(45) Date of Patent: Jul. 28, 2020

(54) EDDY CURRENT SYSTEM FOR WORKPIECE INSPECTION

(71) Applicant: MECTRON ENGINEERING COMPANY, INC., Saline, MI (US)

(72) Inventors: Mark L. Hanna, Saline, MI (US); Lamoyne Durham, Saline, MI (US)

(73) Assignee: MECTRON ENGINEERING COMPANY, INC., Saline, MI (US)

( * ) Notice: Subject to any disclaimer, the term of this patent is extended or adjusted under 35 U.S.C. 154(b) by 46 days.

(21) Appl. No.: 16/070,054

(22) PCT Filed: Jan. 12, 2017

(86) PCT No.: PCT/US2017/013152
§ 371 (c)(1),
(2) Date: Jul. 13, 2018

(87) PCT Pub. No.: WO2017/123727
PCT Pub. Date: Jul. 20, 2017

(65) Prior Publication Data
US 2019/0033259 A1  Jan. 31, 2019

Related U.S. Application Data

(60) Provisional application No. 62/278,503, filed on Jan. 14, 2016.

(51) Int. Cl.
*G01N 27/90* (2006.01)
*B07C 5/344* (2006.01)
(Continued)

(52) U.S. Cl.
CPC ......... *G01N 27/9026* (2013.01); *B07C 5/344* (2013.01); *G01N 27/902* (2013.01);
(Continued)

(58) Field of Classification Search
CPC ...... G01N 27/902; B07C 5/344; B07B 1/4636
See application file for complete search history.

(56) References Cited

U.S. PATENT DOCUMENTS

| 3,886,793 A | 6/1975 | Cramer et al. |
| 4,801,020 A | 1/1989 | Rogne et al. |
| (Continued) | | |

FOREIGN PATENT DOCUMENTS

| KR | 10-1183537 B1 | 9/2012 |
| WO | WO 2014/137408 A1 | 9/2014 |

OTHER PUBLICATIONS

International Search Report of PCT/US2017/013152 dated Mar. 31, 2017.

*Primary Examiner* — Alvaro E Fortich
(74) *Attorney, Agent, or Firm* — Dickinson Wright PLLC (57) ABSTRACT

A workpiece handling system for inspection of workpieces having an elongated cylindrical segment with an enlarged feature such as a threaded fastener. A pair of rollers is inclined with respect to horizontal, and having cylindrical surfaces separated by a gap and rotated about parallel axes, with upwardly presented end surfaces. A drive arrangement rotates the rollers. A slide mechanism enables the rollers to be set at a first and second separation gaps. A workpiece transfer mechanism loads the workpiece onto the rollers, rotation of the rollers set at the first separation gap causes the workpieces to rotate. A sensor probe is positioned in close proximity to the workpiece head as the workpiece is rotated. A workpiece receiving system is provided for handling the workpieces when the rollers are set to the separation second gap, allowing the workpiece to fall under gravity between the rollers.

16 Claims, 8 Drawing Sheets

(51) Int. Cl.
*B07B 1/14* (2006.01)
*B07B 1/46* (2006.01)

(52) U.S. Cl.
CPC ............ *B07B 1/145* (2013.01); *B07B 1/4636* (2013.01); *B07C 2501/0009* (2013.01)

(56) References Cited

U.S. PATENT DOCUMENTS

| | | | |
|---|---|---|---|
| 5,486,760 A | 1/1996 | Selleri et al. | |
| 5,823,356 A | 10/1998 | Goodrich et al. | |
| 2005/0174567 A1 | 8/2005 | Hanna | |
| 2006/0236792 A1* | 10/2006 | Hanna | G01B 5/18 73/865.8 |
| 2010/0120337 A1* | 5/2010 | Kuriyama | B23B 1/00 451/61 |
| 2011/0059679 A1* | 3/2011 | Kitagawa | B24B 27/0633 451/1 |
| 2014/0220193 A1* | 8/2014 | Hocker | G01K 13/00 426/231 |
| 2015/0330948 A1* | 11/2015 | Lingenberg | G01N 23/18 73/598 |
| 2017/0133153 A1* | 5/2017 | Sanders | B21J 15/02 |

* cited by examiner

EDDY CURRENT SYSTEM FOR WORKPIECE INSPECTION

CROSS REFERENCE TO RELATED APPLICATION

This application is a 35 U.S.C. § 371 national phase application of PCT International Application No. PCT/US2017/013152, filed Jan. 12, 2017, which claims the benefit of priority under 35 U.S.C. § 119 to U.S. Provisional Application No. 62/278,503, filed on Jan. 14, 2016, the contents of which are incorporated herein by reference in their entirety.

FIELD OF THE INVENTION

This invention relates to a workpiece inspection system and particularly to one for conducting certain types of analysis on workpieces such as cylindrical workpieces including fasteners.

BACKGROUND

Numerous types of workpieces require 100% quality inspection during their production. A variety of production defects can occur which can lead to the workpiece being out of compliance with required specifications. Elongated cylindrical workpieces such as fasteners, pins, and dowel rods may have a cold formed fastener head or other enlarged feature. Particularly in a cold forming operation, defects such as cracks and other imperfections can result. An example would be a threaded fastener with a hex head and an integrated washer flange at the base of the driving head. Since these configuration features are critical to the performance of the workpiece in their intended application, they are frequently subject to 100% quality inspection. Various techniques for automated quality inspection are implemented today. One such technique uses an eddy current inspection system which evaluates the integrity of a formed metal component by its response to an AC induced magnetic field. These techniques are well known and widely implemented. This invention is especially adapted for eddy current inspection of cylindrical workpieces with an enlarged feature, but could be used for other types of inspection systems.

For eddy current inspection it is necessary that the workpiece be presented and located closely adjacent to an eddy current probe. Moreover, it is necessary to rotate the workpiece such that the perimeter of the feature being inspected is presented to the eddy current probe. Numerous types of workpiece handling systems have been implemented for such inspection in the past. However, prior art systems generally have disadvantages in terms of reliability of inspection, part throughput rate capabilities, equipment and tooling cost, and excessive downtime issues. This invention is related to a workpiece handling system which provides rapid inspection, low-cost investment, reliable inspection, and which will provide little maintenance and downtime issues.

SUMMARY

The workpiece handling system in accordance with the present invention includes a pair of roller elements which are inclined and separated by a small gap. Headed workpieces are directed to drop into the gap between the rollers while the ends of the rollers support the workpiece head. Rotation of the rollers causes the workpiece to also rotate, and its head is maintained in close proximity to the eddy current inspection probe. After inspection, one or more of the rollers is actuated to separate them, allowing the workpiece to drop through the gap between the rollers. A gating system is provided to direct workpieces into a "good" parts stream and a "defect" or "reject" parts stream.

DETAILED DESCRIPTION

Workpiece handling system 10 in accordance with the present invention is particularly adapted for inspection of generally cylindrical workpieces having a formed head or other enlargement along their length or, in a primary application, at an end. Workpiece 2 configurations suitable for use in connection with the present invention have a radially outward projecting feature which forms an edge or flange-like surface enabling it to be supported using the machine configuration described herein. A representative workpiece 2 is shown in each of the Figures. Workpiece 2 is shown in the form of a threaded bolt type fastener having threaded end 4 and an enlarged head 6 forming a hex drive head with an integrated flange or skirt 8 which functions as a washer. As mentioned previously, the production process for producing such threaded workpieces can result in defects which tend to occur at the head 6 and particularly at the flange 8 area. While reference is made to workpiece 2 as described, it is recognize that the workpiece handling system 10 in accordance with this invention will be applicable to other types of workpieces, and other types of inspection beyond eddy current type techniques.

Figure 1:
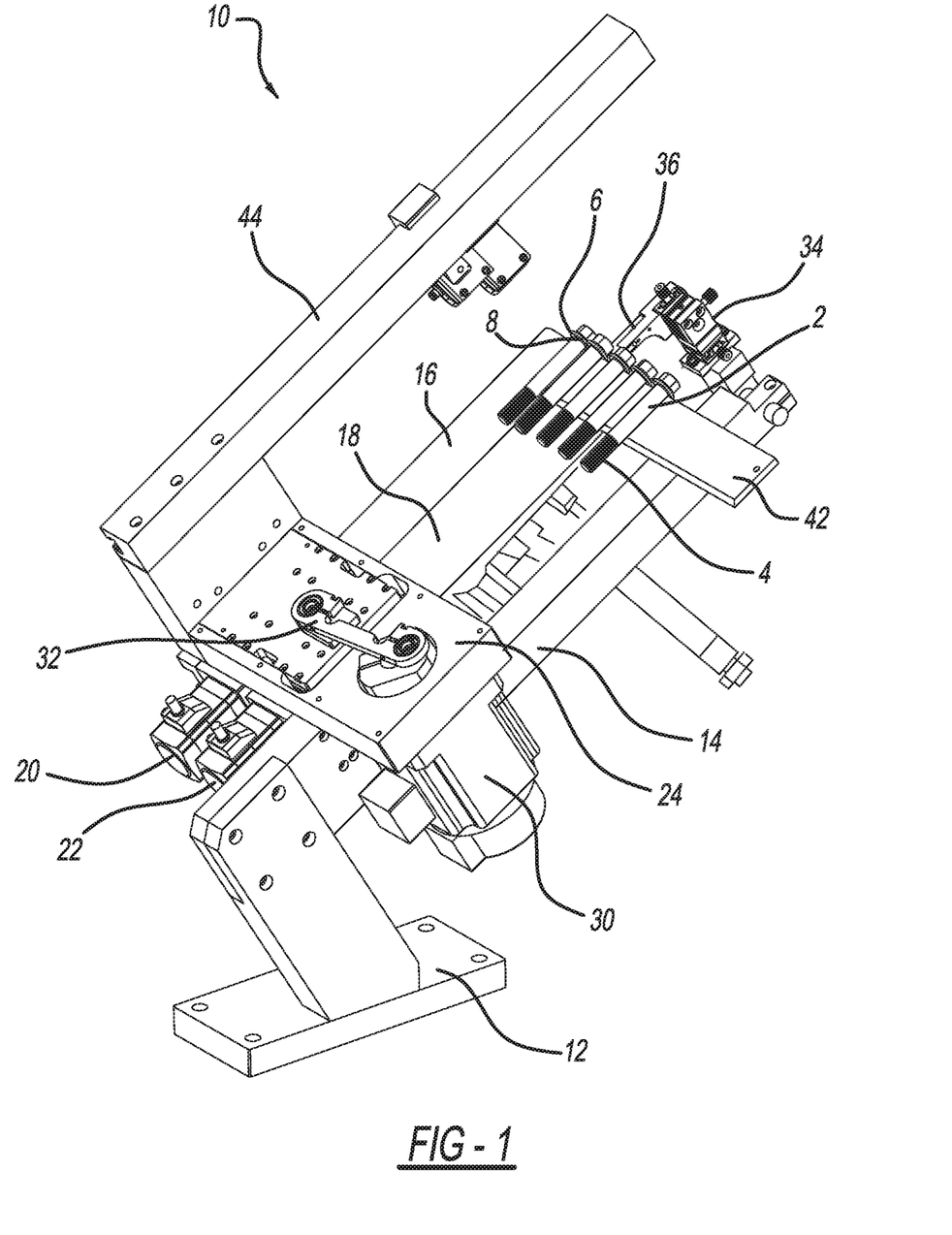
FIG. 1 is a pictorial view of the workpiece handling system in accordance with the present invention.
Figure 2:
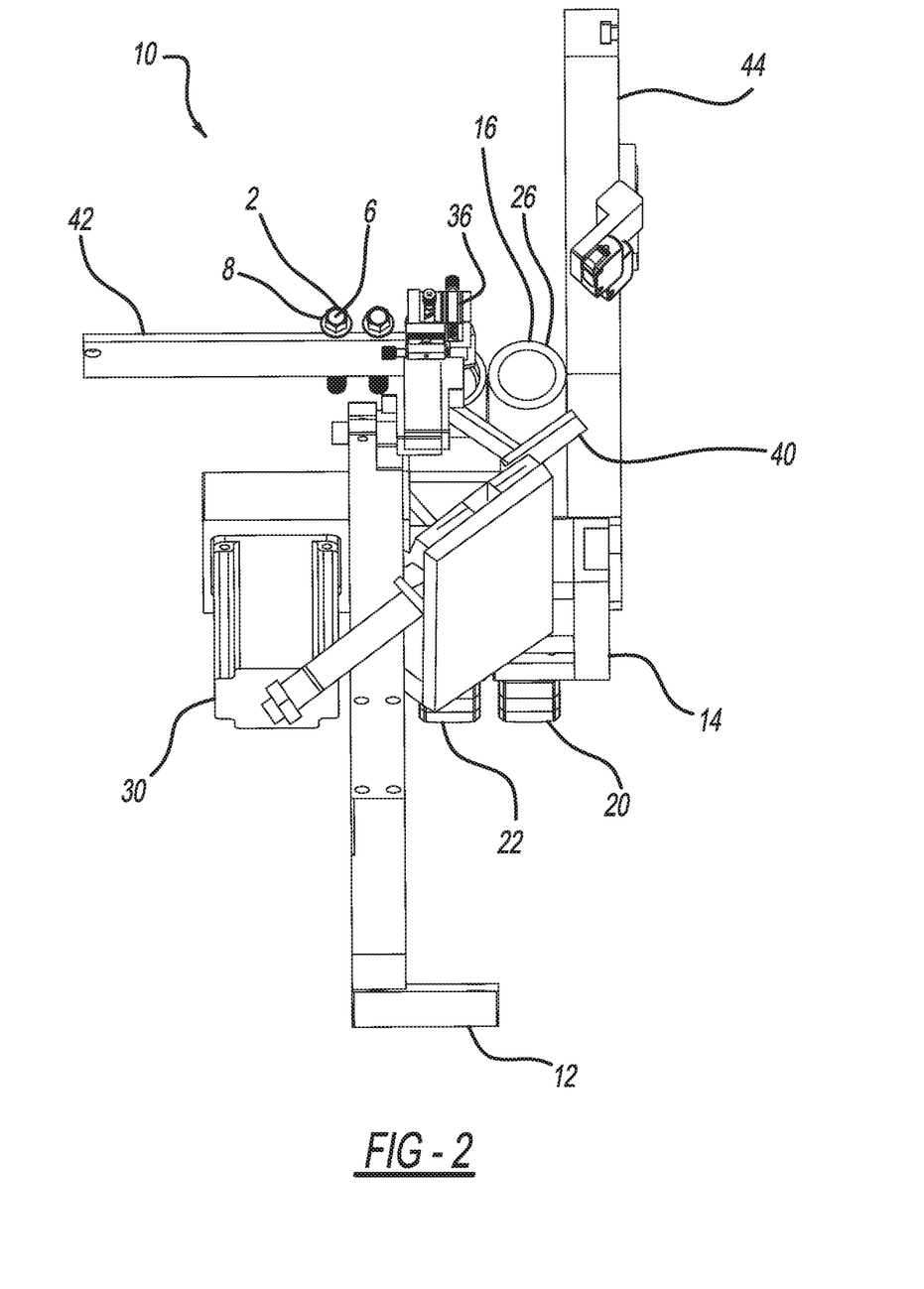
FIG. 2 is a front view of the system shown in FIG. 1.
Figure 3:
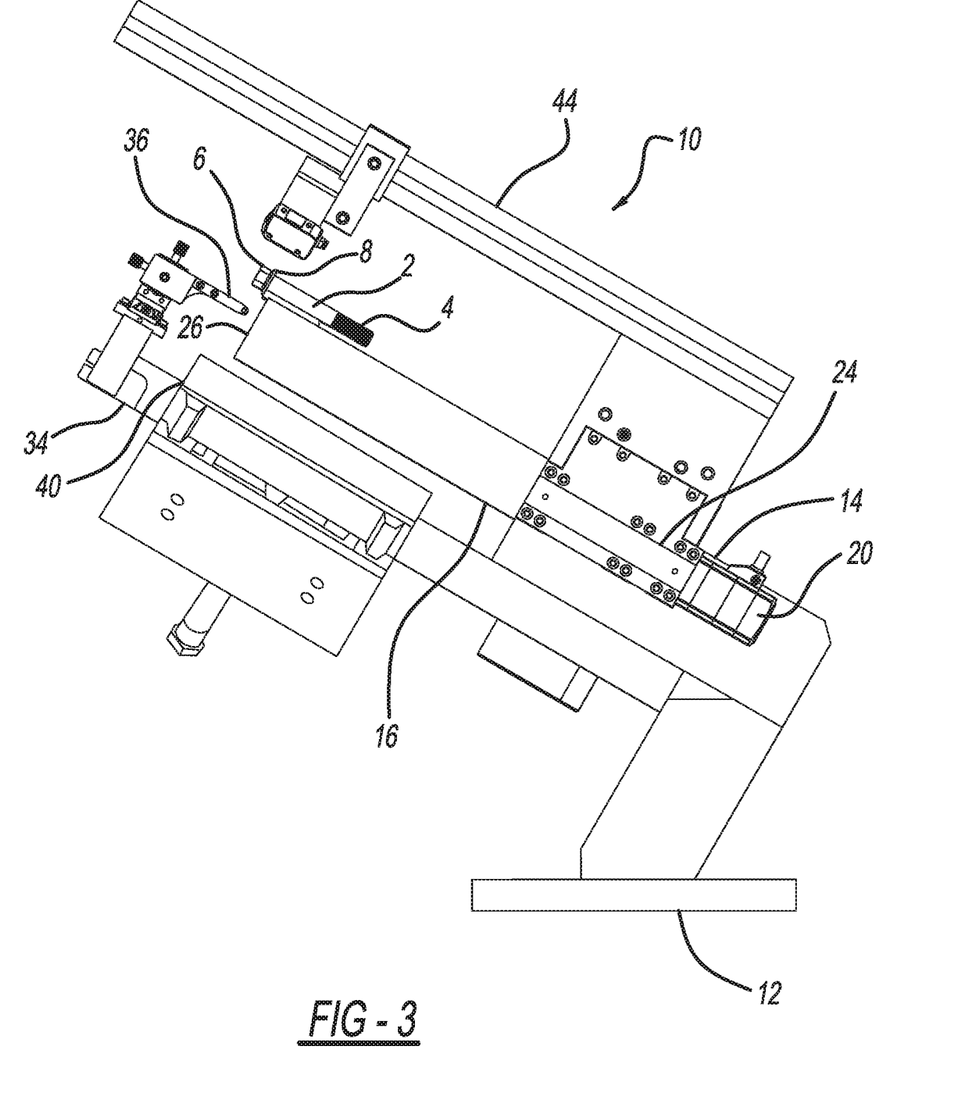
FIG. 3 is a right side view of the system shown in FIG. 1.

With specific reference to FIGS. 1 through 3, primary elements of workpiece handling system 10 are illustrated. As shown, the unit is supported by machine base 12 which supports frame 14. Frame 14 supports a pair of cylindrical rollers 16 and 18 which are supported by the frame to rotate about their longitudinal axes. Rollers 16 and 18 are positioned mutually parallel with a separation gap between them (discussed in more detail below). Drive motors 20 and 22 drive the rollers 16 and 18, respectively. Rollers 16 and 18 are cantilever supported such that they are driven at one of their ends with the opposite upwardly extending end unsupported. Slide mechanism 24 is provided to index one of the rollers to maintain either a relatively small separation gap between the rollers (during inspection) or a relatively large separation gap (following inspection). The separation gap dimensions are chosen such that they permit the rollers 16 and 18 to either support a representative workpiece 2 or allow the workpiece to drop through by gravity between them. As illustrated, rollers 16 and 18 are inclined at roughly a 30° angle from horizontal, presenting their ends 26 and 28 upwardly. Slide mechanism 24 includes actuator motor 30 and eccentric drive link 32. Upon actuation, slide 24 moves one of the rollers, roller 16 in this example, to change its separation gap distance with roller 18 while maintaining their parallel relationship.

Arm 34 is supported by frame extends beneath rollers 16 and 18 and supports eddy current inspection probe 36 which is positioned to be closely adjacent to the workpiece head 6 and flange 8 during inspection. Arm 34 also supports workpiece gate 38. Gate 38 has a sliding fence 40 which can be actuated to control the parts stream after inspection, which will be described below. Arm 34 further supports workpiece supporting plate 42, which allows workpieces 2 to roll into an inspection position. Frame 14 also supports arm 44 which can be used to support additional inspection or workpiece handling devices. For example, vision-based sensors such as a laser sensors, cameras and/or other detectors can be supported by arm 44.

As best illustrated in FIG. 3, rollers 16 and 18 are oriented such that they support workpiece 2 in a position in which their separation gap distance is less than the diameter of the extending cylindrical portion of the workpiece. The inclined orientation of rollers 16 and 18 causes the workpieces 2 to tend to fall along their length down along the rollers under gravity but are supported at the inspection position by the interaction between the fastener head 6 and roller ends 26 and 28.

Figure 4A:
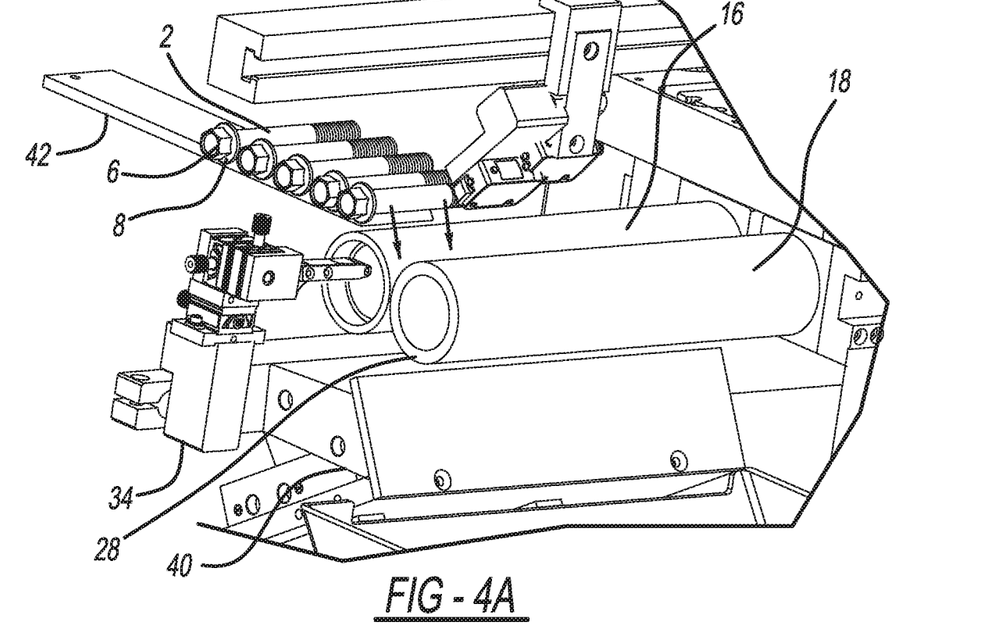
FIGS. 4A-4D are isometric views showing the system respectively feeding, scanning, rejecting, and accepting workpieces.
Figure 4B:
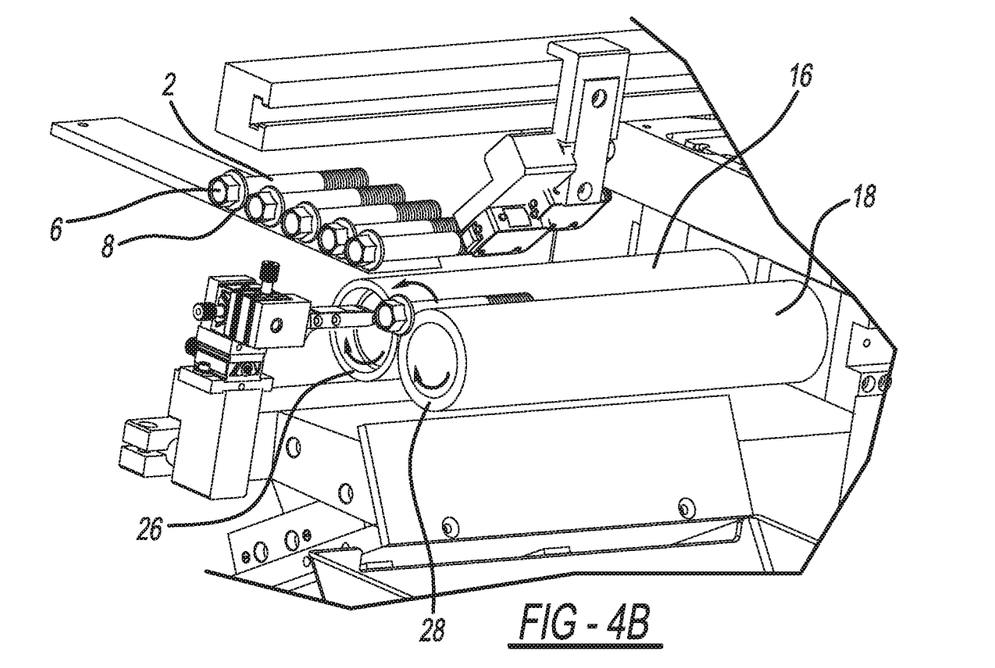
Figure 4C:
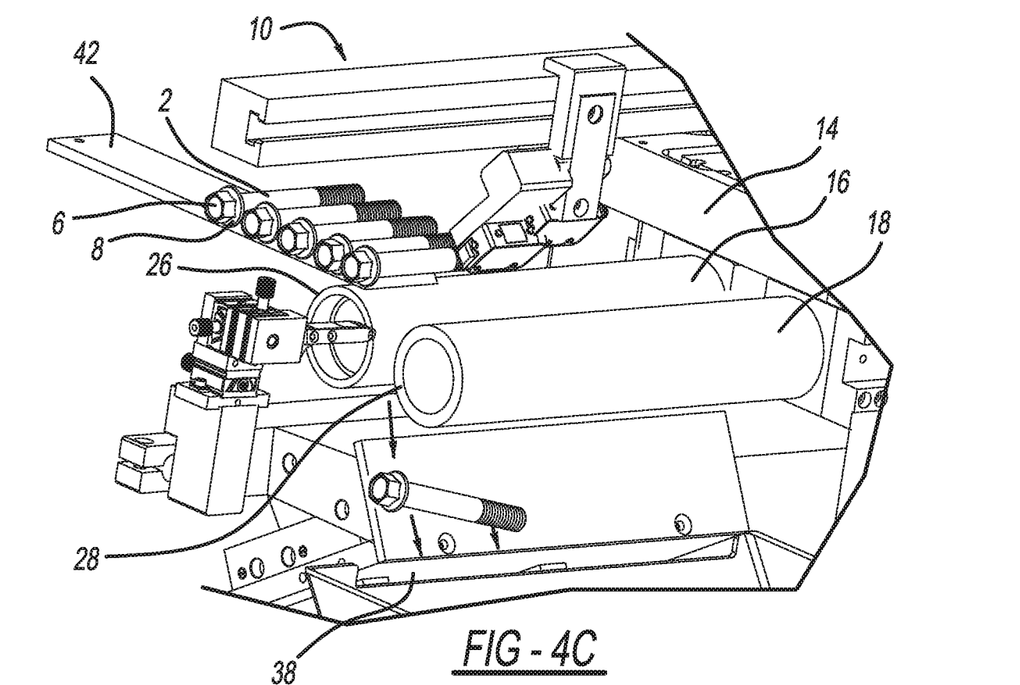
Figure 4D:
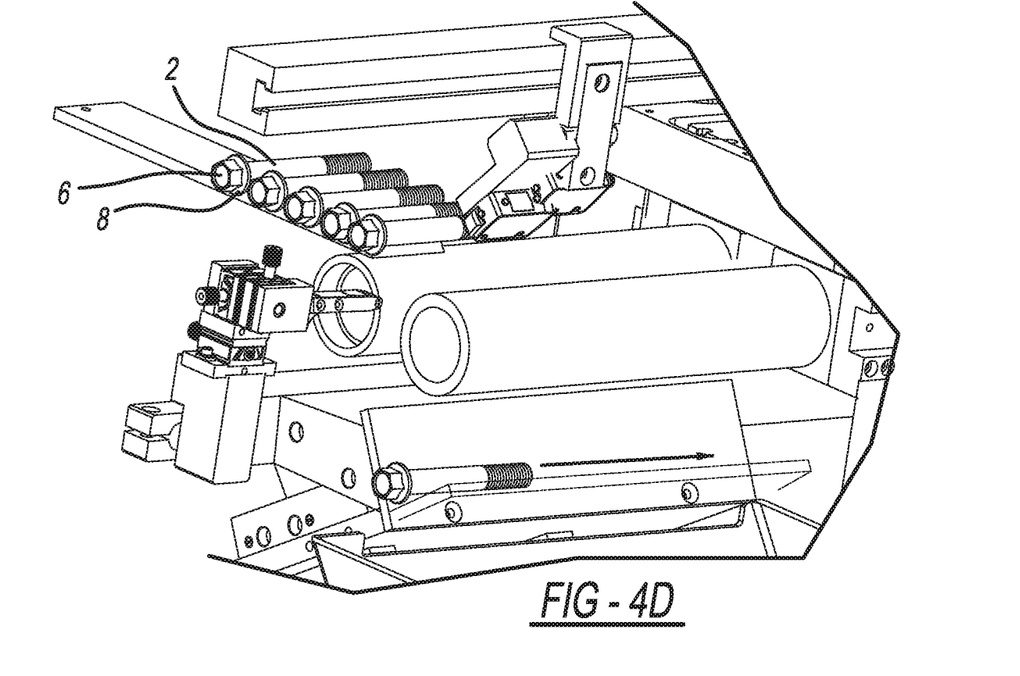
Figure 5A:
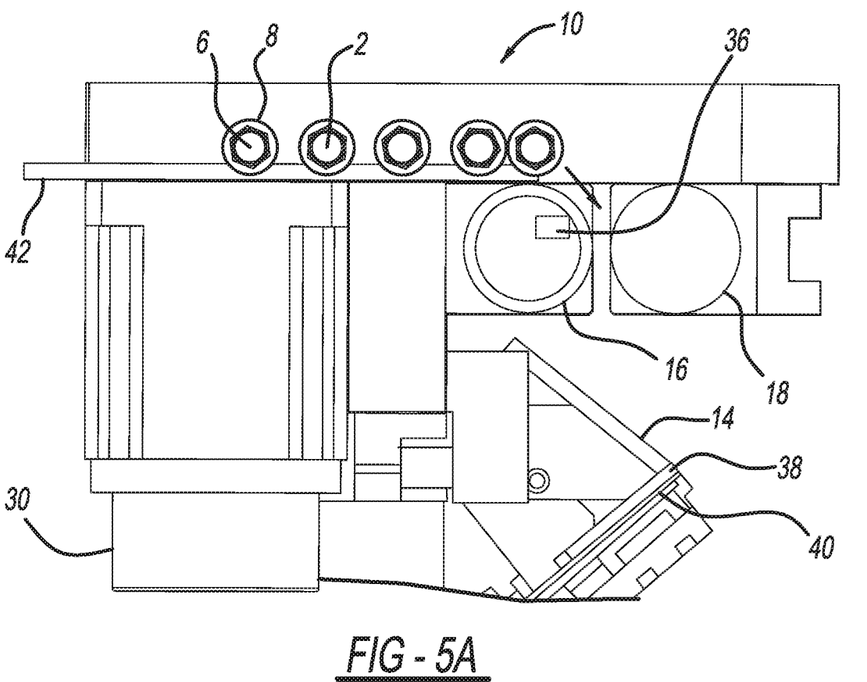
FIGS. 5A-5D are end views showing the system respectively feeding, scanning, rejecting, and accepting workpieces.
Figure 5B:
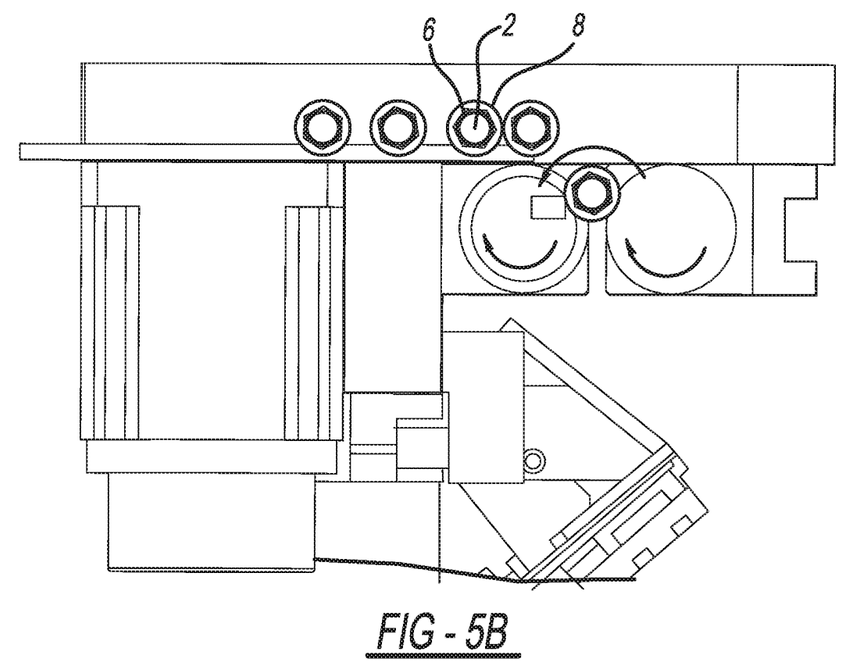

Now with reference to FIGS. 4A-4D and 5A-5D, a representative inspection process sequence is illustrated. In FIGS. 4A and 5A, workpiece 2 is fed by gravity along plate 42 to drop into the gap between rollers 16 and 18. Numerous types of upstream parts handling systems such as parts sorters and other devices may be used to present workpieces 2 onto plate 42. A series of workpieces 2 may be lined up on plate 42 and another gating device (not illustrated) may be used to feed one part at a time at a desired rate into the roller separation gap. Workpieces 2 assume the position shown in FIGS. 4B and 5B with head 6 supported by roller ends 26 and 28. This positioning results by gravity which tends to urge the workpieces 2 to move down along the rollers 16 and 18, and the interaction between the workpiece head 6 and roller ends 26 and 28. Rollers 16 and 18 are rotated in the same clockwise or counterclockwise direction which drive workpiece 2 to also rotate. Eddy current probe 36 is positioned at a desired location adjacent to the workpiece head 6 and flange 8 to provide the desired crack inspection capability.

Figure 5C:
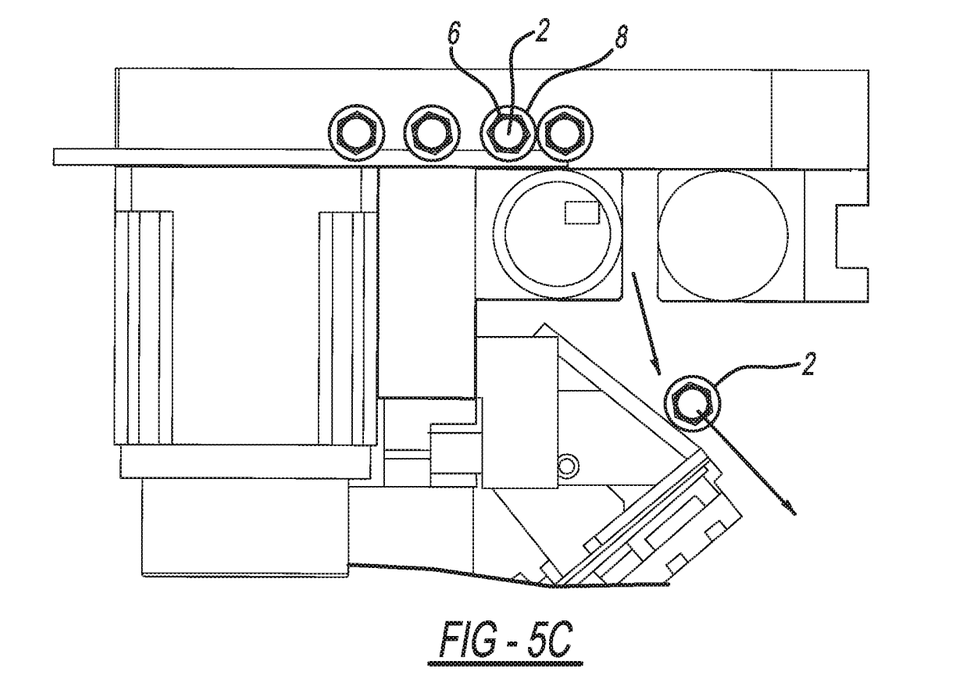
Figure 5D:
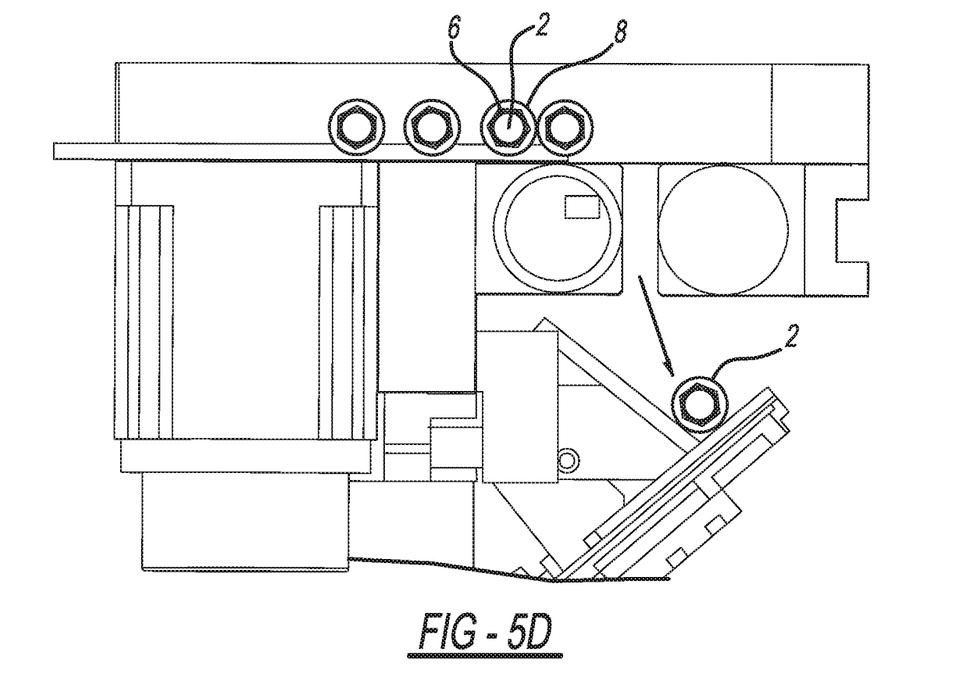

Based on analysis of signals from eddy current probe 36 and potentially other inspection systems it is determined that a particular workpiece 2 is evaluated as a "good" part or a "reject" part. After inspection, slide 24 is actuated to separate rollers 16 and 18 such that workpieces 2 fall between them. FIGS. 4C, 4D, 5C and 5D illustrate the processing of the parts based on such a determination and separating them into parts streams based on their compliance with measured criteria. FIGS. 4C and 5C depict handling of a defective part. In that case workpiece 2 is dropped against workpiece gate 38 and sliding fence 40 is retracted such that the part moves toward a "defect" part stream. However, when a particular workpiece 2 meets measured criteria, sliding fence 40 is extended, allowing that workpiece to travel along sliding fence 40 into an "accept" parts stream.

Figure 6:
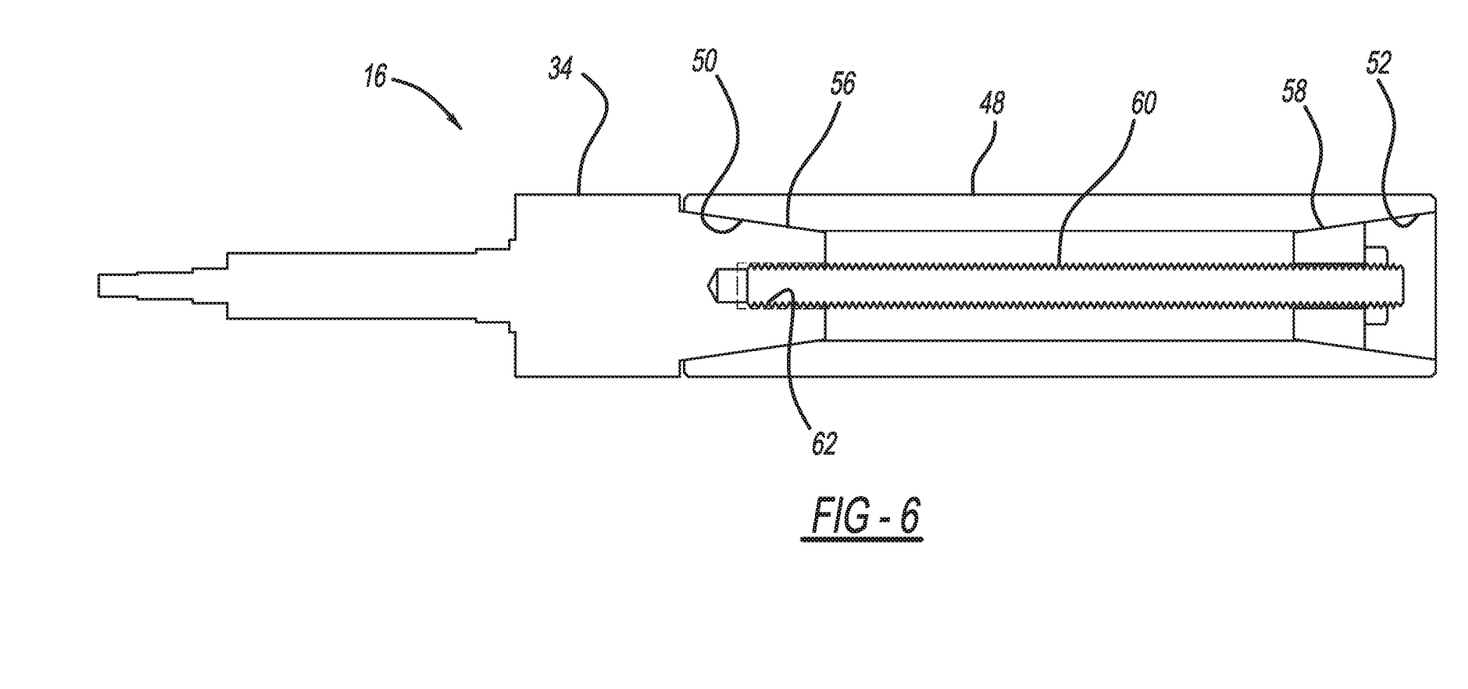
FIG. 6 is a cross-sectional view of a roller configuration which may be used in with the present invention.

FIG. 6 provides a cross-sectional view of a representative roller 16, which may also be used with an identical designed roller 18. The configuration illustrated is particularly suited to enable a rapid change in a roller 16 of one diameter dimension or length to a different configuration which may be suited for a specific configuration of workpiece 2. Roller 16 includes tube 46 having a hollow interior, a cylindrical outer surface 48 and internal tapered ends 50 and 52. Mandrel 54 supports roller 16 and enables it to be positioned and driven for rotation. Mandrel 54 forms tapered end 52 which engages with tube tapered end 50. Tapered plug 58 engages with tube tapered end 50. Threaded rod 60 meshes with internal threads 62 of mandrel 54 and passes through a clearance bore in plug 58. Tightening of threaded rod 60 causes the separation between tapered surfaces 56 and 58 to decrease which forces the tapered surfaces into contact, firmly mounting tube 48. A tube 48 of a different configuration can be readily installed onto mandrel 54 by loosening the tapered connections and replacing tube 48. As mentioned previously, both rollers 16 and 18 preferably have this same configuration if rapid tooling change capabilities are desired.

In this description, rollers 16 and 18 are described as having a cylindrical outer surface and the upwardly extending ends of the rollers 26 and 28 support the workpieces 2 at their heads 6. However, other configurations may be implemented within the scope of the present invention. For example, rollers 16 and 18 could have an outer surface matching a particular workpiece cross-sectional profile and indentations or features of the rollers could be configured to support a workpiece 2 at a point along the length of the rollers rather than only at the end positions as illustrated in the appended drawings.

While the above description constitutes the preferred embodiment of the present invention, it will be appreciated that the invention is susceptible to modification, variation and change without departing from the proper scope and fair meaning of the accompanying claims.

The invention claimed is:

1. A workpiece handling system for inspection of a workpiece of a type having an elongated cylindrical segment with an enlarged feature, comprising;
   a pair of rollers inclined with respect to horizontal, each of the rollers having a cylindrical outer surface, the pair of rollers oriented with parallel longitudinal axes and rotatable, each of the rollers having an upwardly presented end surface,
   a drive arrangement for rotating the pair of rollers in a rotational direction,
   a slide mechanism enabling the rollers to be set at a first separation gap to a second separation gap larger than the first separation gap,
   the pair of rollers supporting the workpiece when set at the first separation gap such that the cylindrical segment is in contact with the roller cylindrical surfaces of both of the rollers and the roller end surfaces support the enlarged feature of the workpiece, whereby rotation of the rollers while the rollers are set at the first separation gap causes the workpiece to rotate,
   a sensor probe positioned in close proximity to the workpiece enlarged feature as the workpiece is rotated by the rollers, and
   a workpiece receiving system for handling the workpiece when the rollers are set to the second separation gap by the slide mechanism, allowing the workpiece to fall under gravity between the rollers onto the workpiece receiving system.

2. A workpiece handling system in accordance with claim 1 further comprising, wherein the workpiece is in the form of an enlongated fastener and wherein the enlarged feature is formed by an enlarged drive head.

3. A workpiece handling system in accordance with claim 1 further comprising, wherein the sensor probe is an eddy current sensor probe.

4. A workpiece handling system in accordance with claim 1 further comprising, wherein the pair of rollers is inclined such that the longitudinal axes of each of the rollers form an angle of about 30° from horizontal.

5. A workpiece handling system in accordance with claim 1 wherein the workpiece receiving system further comprises a gate for separating the workpiece between a good part group and a reject part group.

6. A workpiece handling system in accordance with claim 1 further comprising, an inclined plate which receives and supports the workpiece such that the workpiece rolls along the plate onto the rollers and into the first separation gap between the rollers.

7. A workpiece handling system in accordance with claim 1 further comprising at least one of the rollers having an outer tube forming an interior hollow cavity, internal first and second tapered surfaces at ends of the roller, a mandrel forming a first tapered surface adapted to conform with the first roller tapered surface, a plug forming a tapered surface adapted to conform with the second roller tapered surface, a threaded rod extending between the plug and the mandrel enabling the mandrel and the plug to be tightened to drive the mandrel tapered surface and the plug tapered surface into engagement with the roller first and second tapered surfaces.

8. A workpiece handling system in accordance with claim 1 further comprising, wherein each roller of the pair of rollers is cantilever supported to be mounted to the drive arrangement at one end wherein an opposite end adjacent to the upwardly presented end surface is unsupported.

9. A workpiece handling system in accordance with claim 1 further comprising, wherein the roller end surfaces support the enlarged feature of the workpiece.

10. A workpiece handling system for inspection of a workpiece of a type having an elongated cylindrical segment with an enlarged feature, comprising;
a pair of rollers inclined with respect to horizontal, each of the rollers having a cylindrical outer surface, the pair of rollers oriented with parallel longitudinal axes and rotatable, each of the rollers having an upwardly presented end surface,
a drive arrangement for rotating the pair of rollers in a rotational direction,
a slide mechanism enabling the rollers to be set at a first separation gap to a second separation gap larger than the first separation gap,
the pair of rollers supporting the workpiece when set at the first separation gap such that the cylindrical segment is in contact with the roller cylindrical surfaces of both of the rollers and the roller end surfaces support the enlarged feature of the workpiece, whereby rotation of the rollers while the rollers are set at the first separation gap causes the workpiece to rotate,
a sensor probe positioned in close proximity to the workpiece enlarged feature as the workpiece is rotated by the rollers,
a workpiece receiving system for handling the workpiece when the rollers are set to the second separation gap by the slide mechanism, allowing the workpiece to fall under gravity between the rollers onto the workpiece receiving system, and
a gate for separating the workpiece between a good part group and a reject part group.

11. A workpiece handling system in accordance with claim 10 further comprising, wherein the workpiece is in the form of an elongated fastener and wherein the enlarged feature is formed by an enlarged drive head.

12. A workpiece handling system in accordance with claim 10 further comprising, wherein the sensor probe is an eddy current sensor probe.

13. A workpiece handling system in accordance with claim 10 further comprising, wherein the pair of rollers is inclined such that the longitudinal axes of each of the rollers form an angle of about 30° from horizontal.

14. A workpiece handling system in accordance with claim 10 further comprising, an inclined plate which receives and supports the workpiece such that the workpiece rolls along the plate onto the rollers and into the first separation gap between the rollers.

15. A workpiece handling system in accordance with claim 10 further comprising, at least one of the rollers having an outer tube forming an interior hollow activity, internal first and second tapered surfaces at ends of the roller, a mandrel forming a first tapered surface adapted to conform with the first roller tapered surface, a plug forming a tapered surface adapted to conform with the second roller tapered surface, a threaded rod extending between the plug and the mandrel enabling the mandrel and the plug to be tightened to drive the mandrel tapered surface and the plug tapered surface into engagement with the roller first and second tapered surfaces.

16. A workpiece handling system in accordance with claim 10 further comprising, wherein each of the pair of rollers is cantilever supported to be mounted to the drive arrangement at one end wherein an opposite end adjacent to the upwardly presented end surface is supported.

* * * * *